United States Patent [19]

Brown et al.

[11] Patent Number: 4,776,156

[45] Date of Patent: Oct. 11, 1988

[54] VARIABLE ECCENTRICITY MASS FOR MECHANICAL SHAKERS

[75] Inventors: Galen K. Brown, Okemos; Henry A. Affeldt, Jr., E. Lansing; Thomas A. Esch, Lansing; Richard J. Wolthuis, Haslett, all of Mich.

[73] Assignee: The United States of America as represented by the Secretary of Agriculture, Washington, D.C.

[21] Appl. No.: 49,251

[22] Filed: May 13, 1987

[51] Int. Cl.⁴ .............................................. A01D 46/26
[52] U.S. Cl. .................................................. 56/340.1
[58] Field of Search .................. 56/328 TS, 11.3, 12.6

[56] References Cited

U.S. PATENT DOCUMENTS

| | | | |
|---|---|---|---|
| 2,522,906 | 9/1950 | Smith | 56/328 TS |
| 3,253,391 | 5/1966 | Meldahl | 56/11.3 |
| 3,548,578 | 12/1970 | Shipley, Jr. | 56/328 TS |
| 3,564,825 | 2/1971 | Gould et al. | 56/328 TS |
| 3,771,768 | 11/1973 | Gebendinger | 56/328 TS |
| 3,793,815 | 2/1974 | Hughes | 56/328 TS |
| 4,064,683 | 12/1977 | Tennes et al. | 56/328 TS |
| 4,152,881 | 5/1979 | Hoff | 56/11.3 |
| 4,170,100 | 10/1979 | Hood, Jr. | 56/328 TS |
| 4,669,590 | 6/1987 | Zindler et al. | 56/11.3 |

FOREIGN PATENT DOCUMENTS

| | | | |
|---|---|---|---|
| 816421 | 4/1981 | U.S.S.R. | 56/328 TS |
| 2033197 | 5/1980 | United Kingdom | 56/330 |

*Primary Examiner*—Paul J. Hirsch
*Attorney, Agent, or Firm*—M. Howard Silverstein; John D. Fado; Curtis P. Ribando

[57] ABSTRACT

Means to control imbalance of an eccentric mass connected to a rotating shaft in a shaker housing wherein the eccentric mass is adjacent to but is not fixedly connected to the shaft, wherein a first end of the mass is connected to a mass moving means which can move one end of the mass to a plurality of different distances from the rotating shaft, and is able to hold that end of the mass at each of these distances during rotation; wherein a second end of the mass is restrained from centrifugal movement during rotation of the shaft.

5 Claims, 2 Drawing Sheets

VARIABLE ECCENTRICITY MASS FOR MECHANICAL SHAKERS

FIELD

This invention relates to mechanical shakers for shaking trees and the like to dislodge fruits and nuts therefrom.

PRIOR ART

It is known in the art to rotate unbalanced masses inside a housing so as to vibrate the housing, and to impart such housing vibrations to objects such as trees. See for example U.S. Pat. No. 3,793,815.

It is also known that variable inertial masses offer advantages over fixed inertia eccentrics such as avoidance of undesirable unstable vibrations during acceleration and deceleration. Variable inertial, masses, are shown in U.S. Pat. Nos. 3,564,825 and 4,064,683. These prior art devices employ a hollow cavity filled with flowable heavy material which reacts to gravity and centrifugal force to distribute the material and thereby alter the effect of the mass. These devices do not provide any positive control over the shaking forces. Fluid type eccentrics often require external means for fluid balancing prior to shut down. Simple free fluid eccentrics do not necessarily avoid damaging vibrations where resonance frequencies are very low such as in tree crop harvesting.

SUMMARY

It is an object of the present invention to provide a new and improved vibratory actuator for use in shaking fruit and nut bearing trees during fruit harvesting.

A further object is the provision of an improved vibratory drive in which the eccentricity is positively controlled as determined by physical mechanics between a balanced condition and a desired maximum unbalanced condition.

Another object is to provide a positively controlled vibratory drive that is not dependent on centrifugal force for amount of, or rate of, introduction of shaking force imbalance.

Another object is to provide a vibratory drive of the above character in which the amount of eccentricity and resulting wide range of shaking amplitudes can be controllably varied in a simple, quick operation.

Another object is to provide a vibratory drive of the above character in which the shaking amplitude is independent of the shake frequency.

Another object is to provide an improved vibratory actuator in which the primary governed shaft which determines shake frequency may operate continuously during an entire harvest operation, thus eliminating the time and power required for start-up and shut-down at each tree and the need for the operator to reset the shaking frequency at each tree.

Still another object is to provide a tree shaking mechanism of the above character which has improved tree shaking motion eliminating undesirable and potentially damaging vibrations during mass acceleration and deceleration.

The apparatus of the present invention comprises at least one eccentric mass adjacent to but not fixedly connected to the rotating shaft; an eccentric mass moving means connected to the shaft and to a first end of the mass in order to move this first end to a plurality of positions, each position being at a different distance from the shaft, and to hold this first end of the mass at any one of these distances during rotation; mass movement restraining means at a second end of the mass spaced from the first end which, in cooperation with the hold-in-place capabilities of the mass moving means, restrains centrifugal movement of the mass during rotation.

DRAWINGS

DETAILED DESCRIPTION

Figure 1:
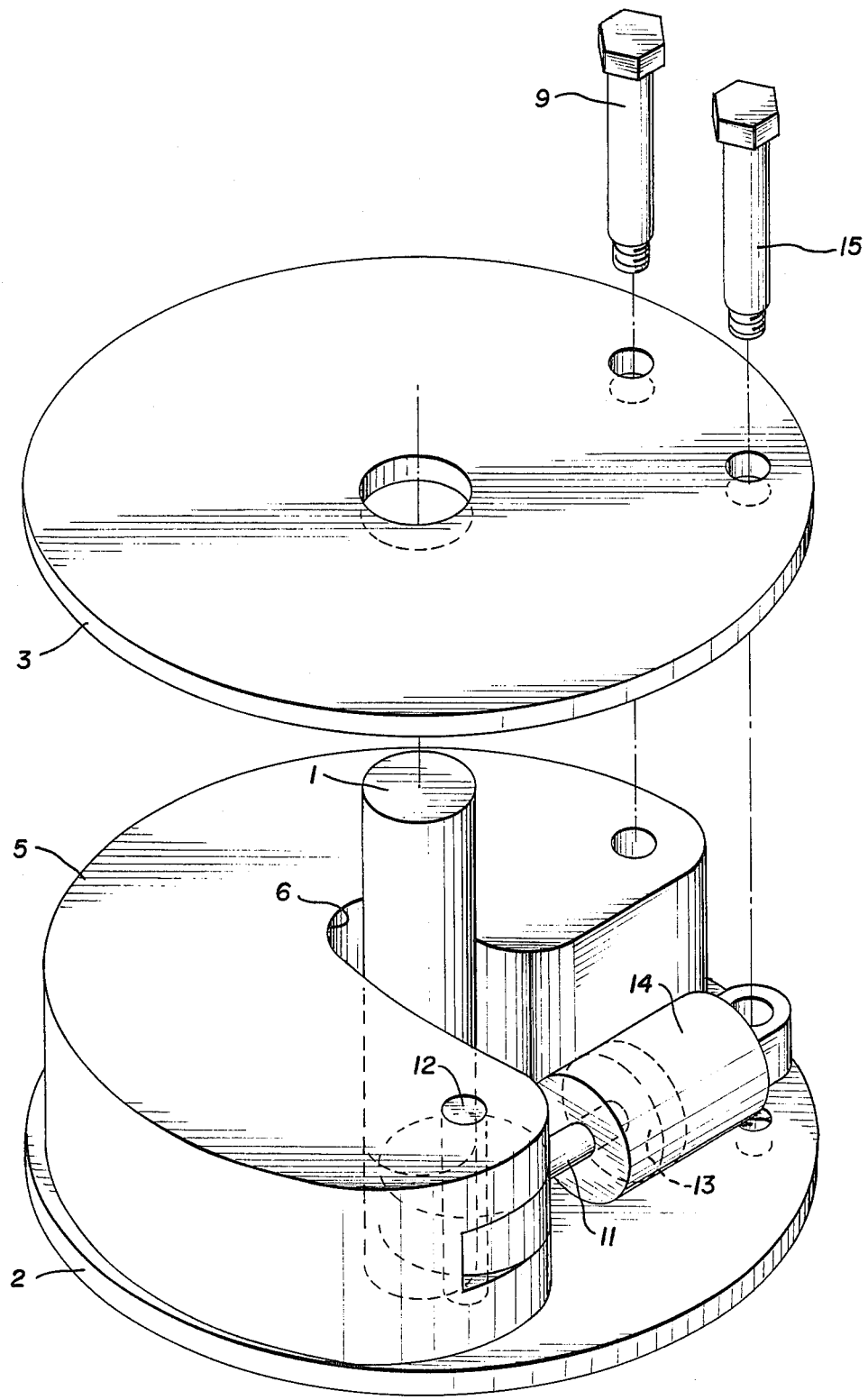
FIG. 1 is a partially exploded perspective view of one embodiment of the present invention.

Reference numeral 1 in FIG. 1 designates a shaft. The manner in which the shaft is driven and connected to elements such as the housing and the vehicle which carries the housing are well known in the art as shown by U.S. Pat. Nos. 3,564,825, 3,793,815, 3,812,662, 4,064,683, 4,179,879 and 4,208,861.

Two mounting brackets shown as discs 2 and 3 are fixedly secured to shaft 1 in the prior art manner (e.g., welding or keying), and rotate therewith. Sandwiched between the discs is an eccentric mass 5 having an arcuate slot 6 adjacent but not fixedly connected to shaft 1. A shoulder bolt 9 extending through disc 3 and the mass 5 is screwed into disc 2 to pivotally connect one end of the mass between the discs.

At another end of the mass, a connecting rod 11 extends through a hole therein and is held in place in the hole by means of a pin 12 which drops through a pin opening in the mass and the rod. The opposite end of connecting rod 11 is connected to a piston 13 inside a cylinder 14, which is sandwiched between discs 2 and 3, and is pivotally connected at one end to both of the discs by means of a shoulder bolt 15.

Shaft 1 may include a plurality of longitudinal internal channels (not shown) to supply hydraulic power to the piston inside cylinder 14, or to supply hydraulic or electric power to alternative mass moving means such as a rotary linear actuator (e.g., rotary screw means) or similar positive positioning device. The details of supplying such power while the apparatus is rotating will be obvious to those skilled in the art, and is not part of the present invention.

Figure 2:
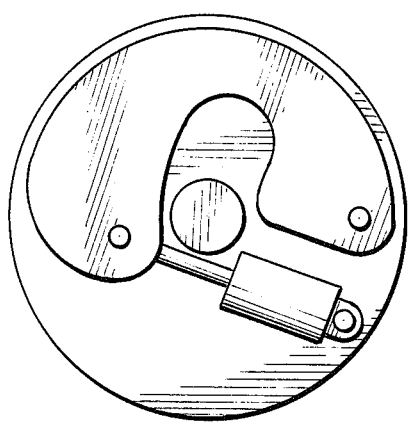
FIGS. 2 and 3 are top views of the full and zero eccentricity positions of the mass, respectively.
Figure 3:
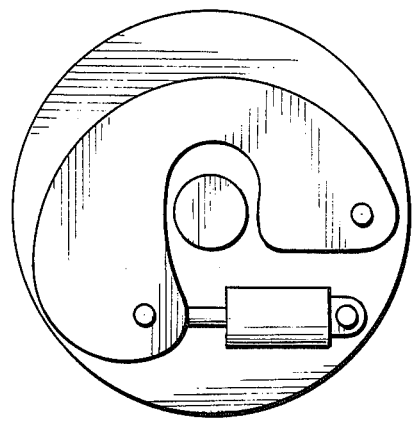

Movement of piston 13 inside the cylinder 14 changes the distance of one end of the mass from the shaft, thus altering the vibratory effect of the mass. In its retracted position, e.g., FIG. 3, the center of gravity of the mass 5 plus cylinder 14 is nearly coincident with the center of rotation of the shaft 1, thus imparting no imbalance to rotation. In an extended position, e.g., FIG. 2, the center of gravity of mass 5 plus cylinder 14 is non-coincident, providing an imbalance of eccentricity in the rotating mechanism, thereby generating vibratory shaking forces. The amount of extension of connecting rod 11 controls the amount of eccentricity which in turn changes the shaking force and amplitude. Magnitude of shaking can be altered by varying the position of the center of gravity of mass 5 plus cylinder 14. Frequency of vibration is controlled by the velocity of rotation of the shaft.

Figure 4:
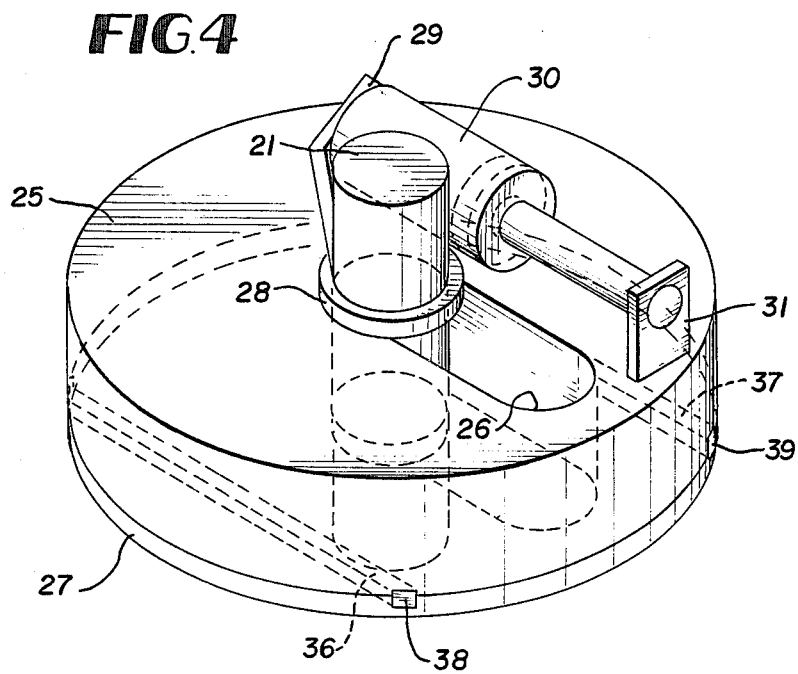
FIG. 4 is a partially exploded perspective view of an alternative embodiment.

Another embodiment of the present invention is shown in FIG. 4. Referring thereto, reference numeral 21 designates the rotating shaft. An eccentric mass 25 includes a longitudinal linear slot 26 for sliding engagement with rotating shaft 21 to permit the mass to be transversely moved relative to the shaft. The mass is sandwiched between disc 27 and collar 28 which are fixed to the shaft in the prior art manner. A plate 29 is fixed to the shaft and to a positive mass moving means 30 such as a piston-cylinder. The opposite end of the cylinder is connected by a piston rod to a plate 31 which is fixed to the mass 25. At the bottom of mass 25 are two narrow slots 36 and 37 which slidingly engage keys 38 and 39, respectively, that are fixed to the top of disc 27. When the mass is moved by moving means 30, the key-in-slot arrangement guides such movement. During rotation, the key-in-slot arrangement cooperates with the hold-in-place capabilities of the mass moving means 30 to prevent centrifugal and movement of the mass during rotation. The magnitude of the shaking force thus is altered by varying the extension caused by the rod projecting from the moving means 30, thereby varying the position of the center of gravity of mass 25 with respect to the center of rotation of shaft 21, which changes the mass balance and drive eccentricity.

While a single mass is disclosed in the drawings, it will be obvious that a plurality of separate shafts and masses rotating in the same or opposite directions in the same or multiple planes can be employed in combination inside a shaker housing or connected housings, or an individual shaft may have more than one mass attached thereto.

I claim:

1. In a device for shaking a housing by mean of an eccentric mass connected to a rotating shaft, the improvement comprising
   a. at least one eccentric mass adjacent but not fixedly connected to said shaft, wherein said mass includes an arcuate slot adjacent said shaft;
   b. eccentric mass moving means connected to said shaft so as to rotate therewith, and also connected to a first end of said mass in order to move said first end of said mass to a plurality of different distances from said shaft, and to hold said first end of said mass at anyone of said distances while said shaft and mass are rotating, wherein said mass may be held at a position whereat said mass does not impart imbalance during rotation of said shaft;
   c. restraining means at a second end of said mass spaced from said first end, said restraining means and said moving means acting together to restrain centrifugal movement of said mass during rotation; and
   d. at least one bracket fixed to and rotated by said shaft, wherein said mass moving means is connected to said bracket; wherein said restraining means comprises means to pivotally secure said second end of said mass to said bracket.

2. The apparatus of claim 1 wherein there are two of said brackets, and wherein said mass and mass moving means are sandwiched therebetween.

3. The apparatus of claim 2 wherein said mass moving means comprises a piston-cylinder.

4. The apparatus of claim 3 wherein said piston-cylinder is pivotally connected at one end between said brackets.

5. The apparatus of claim 6 wherein said mass moving means is a rotary linear actuator.

* * * * *